US012599115B2

(12) United States Patent
Van Den Berg et al.

(10) Patent No.: US 12,599,115 B2
(45) Date of Patent: Apr. 14, 2026

(54) ANIMAL HUSBANDRY SYSTEM

(71) Applicant: LELY PATENT N.V., Maassluis (NL)

(72) Inventors: Karel Van Den Berg, Bleskensgraaf (NL); Aalte Wille Mijnte De Kruijf, Oud Alblas (NL); Paulus Jacobus Maria Van Adrichem, Delfgauw (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/255,797

(22) PCT Filed: Dec. 10, 2021

(86) PCT No.: PCT/IB2021/061554
§ 371 (c)(1),
(2) Date: Jun. 2, 2023

(87) PCT Pub. No.: WO2022/130145
PCT Pub. Date: Jun. 23, 2022

(65) Prior Publication Data
US 2023/0404040 A1 Dec. 21, 2023

(30) Foreign Application Priority Data

Dec. 15, 2020 (NL) ..................................... 2027108

(51) Int. Cl.
A01K 11/00 (2006.01)
A01K 1/01 (2006.01)
A01K 29/00 (2006.01)
(52) U.S. Cl.
CPC .............. A01K 29/005 (2013.01); A01K 1/01 (2013.01); A01K 11/006 (2013.01)

(58) Field of Classification Search
CPC ...... A01K 29/005; A01K 1/01; A01K 11/006; A01K 1/031; A61B 5/20; A61B 5/202
(Continued)

(56) References Cited

U.S. PATENT DOCUMENTS

2012/0299731 A1* 11/2012 Triener ................... G16Z 99/00
702/19
2014/0311415 A1* 10/2014 Tanigawa ............. A01K 29/005
119/163
(Continued)

FOREIGN PATENT DOCUMENTS

EP 1 564 664 A2 8/2005
WO WO 2014/118788 A2 8/2014
(Continued)

*Primary Examiner* — Zoe Tam Tran
(74) *Attorney, Agent, or Firm* — Oblon, McClelland, Maier & Neustadt, L.L.P.

(57) ABSTRACT

A animal husbandry system, where a group of animals can move about freely in a shed, a plurality of sensors being provided, suitable for monitoring respective different regions of the shed, the sensors being provided in such a way that, collectively, they are suitable for monitoring substantially the complete shed. The animal identification system provided is suitable for identifying and locating individual animals in the shed, and includes processing means operatively connected to the sensors and to the animal identification system, the processing means being programmed for determining for each individual animal a urinating and/or defecating pattern or frequency. In this way, a highly useful system is realized. Firstly, in order to be able to monitor the health status of animals, urinating and/or defecating patterns or frequencies are highly meaningful. Secondly, they render an efficient cleaning of the shed possible.

17 Claims, 1 Drawing Sheet

Figure 1:
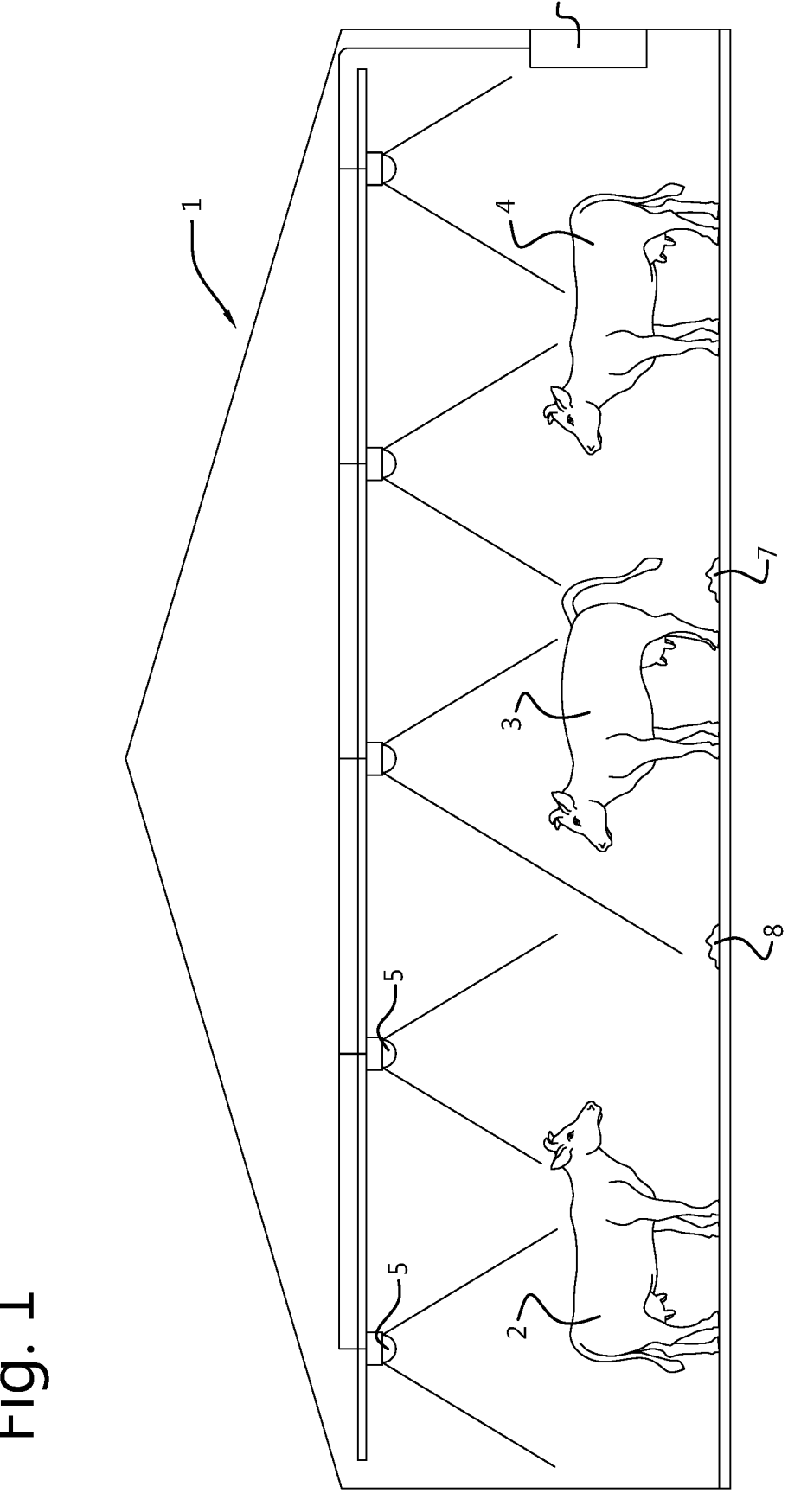

(58) Field of Classification Search
USPC ......................................... 119/421, 416, 458
See application file for complete search history.

(56) References Cited

U.S. PATENT DOCUMENTS

| | | | |
|---|---|---|---|
| 2016/0262356 A1* | 9/2016 | Perez-Camargo ... | A61B 5/4255 |
| 2017/0196196 A1* | 7/2017 | Trottier ................ | A01K 15/027 |
| 2017/0303505 A1* | 10/2017 | Karsijns ................. | B25J 9/1697 |
| 2019/0271125 A1* | 9/2019 | Fornarotto ........... | G05D 1/0246 |
| 2020/0042780 A1* | 2/2020 | Hori ..................... | A01K 1/0107 |
| 2020/0175611 A1* | 6/2020 | Gelfand ................. | G06F 16/27 |
| 2020/0236897 A1* | 7/2020 | Hori ..................... | A01K 29/005 |
| 2022/0104929 A1* | 4/2022 | Cummins ............. | G16H 40/63 |
| 2022/0272936 A1* | 9/2022 | Brink ...................... | A01K 1/01 |
| 2023/0337636 A1* | 10/2023 | Shmigelsky ........... | G06V 10/25 |

FOREIGN PATENT DOCUMENTS

| | | |
|---|---|---|
| WO | WO 2015/088345 A1 | 6/2015 |
| WO | WO 2015/104250 A1 | 7/2015 |
| WO | WO 2015/126240 A1 | 8/2015 |
| WO | WO 2019/160480 A2 | 8/2019 |
| WO | WO 2020/036495 A1 | 2/2020 |
| WO | WO 2020/040650 A1 | 2/2020 |

* cited by examiner

ANIMAL HUSBANDRY SYSTEM

CROSS REFERENCE TO RELATED APPLICATIONS

This application is a National Stage entry under 35 U.S.C. § 371 of PCT/IB2021/061554, filed on Dec. 10, 2021, and claims priority to Netherlands Patent Application No. 2027108, filed on Dec. 15, 2020, the entire contents of which are incorporated herein by reference.

The present invention relates to an animal husbandry system.

Such systems are widely known in the art. WO 2015/104250 discloses a method and system of rearing chickens in which a plurality of cameras is provided in a shed for monitoring the shed floor and adjusting the shed floor illumination. Animal excrements are not monitored. EP1564664 shows a cleaning arrangement for a deep litter house in which the positions of droppings are determined with the aid of a sensor and where the droppings are picked off the floor area with a robot, connected to the sensor. A link between detected excrements and individual animals is neither established nor contemplated. WO2014/118788 discloses an optical monitoring system for livestock in which various activities may be measured to determine the health state of the population of animals. For chickens, urination/defecation may be measured. WO2019/160480 shows an arrangement for manure handling in which an autonomous manure scraper is controlled in dependence on automatically observed manure conditions. Again, a link between detected excrements and individual animals is neither established nor contemplated. WO2015/126240 discloses a system for animal monitoring in which manure can be linked to individual animals by means of a tracer to be ingested and excreted by the animals. Thus, individual manure analysis is enabled, so that feeding can be optimized. The use of ingestible tracers is cumbersome and no conclusions on animal health are envisaged.

There is a need for an improved method. It is an object of the present invention to provide such an improved method.

The invention achieves the object at least in part by means of a system according to claim 1, in particular an animal husbandry system, wherein a group of animals can move about freely in a shed, a plurality of sensors being provided, suitable for monitoring respective different regions of the shed, the sensors being provided in such a way that, collectively, they are suitable for monitoring substantially the complete shed, an animal identification system being provided, suitable for identifying and locating individual animals in the shed, processing means being provided, operatively connected to the sensors and to the animal identification system, said processing means being programmed for determining for each individual animal a urinating and/or defecating pattern or frequency.

In this way, a highly useful system is realized. The invention is based on the insight that, firstly, in order to be able to monitor the health status of animals, urinating and/or defecating patterns or frequencies are highly meaningful. Secondly, they render a more efficient cleaning of the shed possible.

Suitable and advantageous embodiments are described in the dependent claims, as well as in the description below.

In accordance with an embodiment, said processing means are programmed for detecting animal excretion actions of urine and/or feces, and to link every detected animal excretion action to an individual animal in the shed.

This is a practical implementation which enables the efficient determination of the urinating and/or defecating patterns or frequencies.

Advantageously, the processing means are programmed for recognizing, with the aid of the sensors, if an animal lifts its tail. In this way, a relatively simple, yet reliable system is realized.

In a further embodiment, the processing means are programmed to determine spatial and/or temporal parameters related to detected animal excretion actions. Thus, the determination of the urinating and/or defecating patterns or frequencies is facilitated.

In an alternative embodiment, said processing means are programmed for detecting animal excrement on the shed floor, such as urine and/or feces, and to link every detected animal excrement to an individual animal in the shed. This is a further practical implementation which enables the efficient determination of the urinating and/or defecating patterns or frequencies.

Advantageously, the processing means are programmed to determine spatial and/or temporal parameters related to detected animal excrement. Thus, the determination of the urinating and/or defecating patterns or frequencies is facilitated.

In accordance with an embodiment, the processing means are programmed to distinguish between urine and feces. In this way, both urinating and defecating patterns or frequencies can be established.

In a further embodiment, the processing means are programmed to generate a health status signal based upon the determined animal urinating and/or defecating pattern or frequency. Thus, animal health monitoring is improved.

In yet another embodiment, the processing means are programmed to generate a calving status signal based upon the determined animal urinating and/or defecating pattern or frequency. This enables a better monitoring of the calving process.

In accordance with a further embodiment, the processing means are programmed to generate a stress status signal based upon the determined animal urinating and/or defecating pattern or frequency. In this way, stress monitoring is improved.

Advantageously, the processing means make use of artificial intelligence. This enhances the efficiency of the system.

According to another embodiment, the processing means are programmed for determining that a certain area of the shed has to be cleaned and for generating a dedicated cleaning signal. This facilitates the shed cleaning.

In yet a further embodiment, automatic cleaning means are provided suitable for cleaning at least a part of the shed floor, the processing means being programmed for establishing a degree of pollution of at least a part of the shed floor, and for activating the automatic cleaning means to clean said part as soon as a certain pollution threshold has been reached. In this way, an efficient cleaning process is achieved.

In another embodiment, the automatic cleaning means comprise a cleaning robot suitable for picking up and removing feces, the processing means being programmed for guiding the cleaning robot to the relevant part of the shed floor. This results in a highly efficient and user-friendly system.

Advantageously, the processing means anticipate which area of the shed has to be cleaned, making use of the determined urinating and/or defecating patterns or frequencies. This enhances the efficiency of the system even further.

The invention will now be further explained with reference to the following FIG. 1, which schematically illustrates the system according to the invention.

FIG. 1 shows an animal husbandry system with a stable or shed or barn 1 wherein a group of animals 2, 3, 4 can move about freely. In the example shown the animals are cows. Of course, the invention can also be applied to an animal husbandry system involving other animals, such as goats, pigs, horses, chickens, turkeys, etcetera. The shed 1 can also be a structure with, for example, a partly open roof.

In the shed 1 a plurality of sensors 5 is provided, suitable for monitoring respective different regions of the shed 1. The sensors 5 can be cameras or other optical sensors. They are provided in such a way that, collectively, they are suitable for monitoring substantially the complete shed 1, particularly the animals and the shed floor. The sensors can be provided in the shed 1 above the animals, as shown in FIG. 1, or at the roof or the walls of the shed 1.

Furthermore, an animal identification system (known as such, not shown) is provided, suitable for identifying and locating individual animals 2, 3, 4 in the shed 1. The identification system is preferably electronic and can make use of transponders, collars, eartags, implanted or ingested electronic microchips, etcetera.

A control unit 6 with processing means is also provided, operatively connected to the sensors 5 and to the animal identification system. In accordance with the invention, said processing means is programmed for determining for each individual animal a urinating and/or defecating pattern or frequency, as will be explained below in further detail. The control unit 6 may comprise a computer or any processing means. It can also be located at a distance from the shed 1.

In a first embodiment, said processing means are programmed for detecting animal excretion actions of urine and/or feces, and to link every detected animal excretion action to an individual animal in the shed. This is a practical implementation which enables the efficient determination of the urinating and/or defecating patterns or frequencies.

For example, the processing means are programmed for recognizing, with the aid of the sensors 5, if an animal 3 lifts its tail. This is a relatively simple, yet reliable way to detect an animal excretion action. The cow 3 lifts its tail and excretes, for example, feces 7 on the shed floor. The processing means detect this and are programmed to determine spatial and/or temporal parameters related to detected animal excretion actions. For example, the time and possibly also the place of every excretion action of every animal are registered. Of course, the same can be done when a cow urinates. The processing means are programmed to distinguish between urine and feces. In this way, both urinating and defecating patterns or frequencies can be established.

In this way, for each cow in the shed 1 a list is generated containing the defecation and urination points in time and/or their location in the shed 1. Thus, the determination of the urinating and/or defecating patterns or frequencies per cow is rendered possible. From the list, the processing means can easily determine these.

In a second embodiment, said processing means are programmed for detecting animal excrement 7, 8 on the shed floor, such as urine and/or feces, and to link every detected animal excrement 7, 8 to an individual animal 2, 3, 4 in the shed. This is a further practical implementation which enables the efficient determination of the urinating and/or defecating patterns or frequencies.

Again, the processing means are programmed to determine spatial and/or temporal parameters related to detected animal excrement. For example, the location in the shed 1, and possibly also the time (in case of newly detected cow droppings, for example) of every detected animal excrement 7, 8 of every animal 2, 3, 4 are registered. Of course, the same can be done when a cow urinates.

Just like in the first embodiment, in this way, for each cow in the shed 1 a list is generated containing the defecation and urination points in time and/or their location in the shed 1. Thus, the determination of the urinating and/or defecating patterns or frequencies per cow is rendered possible. From the list, the processing means can easily determine these.

A highly useful system is thus realized. It is based on the insight that, in order to be able to monitor the health status of animals, individual urinating and/or defecating patterns or frequencies are highly meaningful. Moreover, an efficient cleaning of the shed 1 is thus facilitated. This will be further elucidated below.

The processing means are programmed to generate a health status signal based upon the determined animal urinating and/or defecating pattern or frequency. A remarkable deviation from a normal defecation or urination pattern or frequency indicates that a certain cow 2, 3, 4 may have a health problem. Thus, animal health monitoring can be improved.

The processing means are also programmed to generate a calving status signal based upon the determined animal urinating and/or defecating pattern or frequency. A cow 2, 3, 4 about to calve will have a lower frequency both for urinating and for defecating. So the system enables a better monitoring of the calving process.

In accordance with a further embodiment, the processing means are programmed to generate a stress status signal based upon the determined animal urinating and/or defecating pattern or frequency. For example, if a cow 2, 3, 4 suffers from stress she will have a higher defecating frequency, but a lower urinating frequency. In this way, stress monitoring is improved.

Advantageously, the control unit 6 with the processing means make use of artificial intelligence. This enhances the efficiency of the system. For example, the processing means can be fed with a large number of image data representing urinating cows, defecating cows and 'normal' cows. The processing means can learn from these image data the correct detection of a urinating or defecating cow, when receiving image data from the sensors 5.

The invention can also facilitate an efficient cleaning of the shed 1.

To this effect, the processing means are programmed for determining that a certain area of the shed 1 has to be cleaned and for generating a dedicated cleaning signal. This can be the case, for example, if a certain minimum number of new cow droppings 7, 8 per square meter is detected by means of the sensors 5. The relevant part of the shed floor can then be cleaned, either manually, or preferably automatically, as will be explained below.

In an embodiment of the invention, automatic cleaning means (known as such, not shown) are provided in, at or near the shed 1, suitable for cleaning at least a part of the shed floor, the processing means being programmed for establishing a degree of pollution of at least a part of the shed floor, and for activating the automatic cleaning means to clean said part as soon as a certain pollution threshold has been reached. The degree of pollution may be established with the aid of the sensors 5. It is also possible to provide additional sensors (not shown), connected to the control unit 6 with the processing means, for this task. In this way, an efficient cleaning process is achieved.

In a further embodiment, the automatic cleaning means comprise a cleaning robot (known as such, not shown) suitable for picking up and removing feces 7, 8, the processing means being programmed for guiding the cleaning robot to the relevant part of the shed floor. This results in a highly efficient and user-friendly system.

The automatic cleaning means can comprise sucking means suitable for sucking up dirt and a collector for collecting the dirt. They can also comprise scraping and/or brushing and/or shoveling means, all known as such.

The cleaning robot, that is, its drive means, can be charged at a base station in, at or near the shed 1 with means for charging the robot's batteries (not shown, known as such).

Knowing the location of the cows 2, 3, 4 in the shed 1 and knowing their defecation patterns or frequencies, the processing means can not only detect the current shed pollution, but also anticipate on the upcoming shed pollution. Advantageously, the processing means anticipate which area of the shed 1 has to be cleaned, making use of the determined urinating and/or defecating patterns or frequencies. For example, a cow 2, 3, 4 due for urinating or defecating according to its determined frequencies and/or patterns will very likely soon pollute its immediate surroundings. This can be taken into account by the processing means. In this way, the efficiency of the system is even further enhanced.

REFERENCE NUMERAL LIST 1 shed
2 cow
3 defecating cow
4 cow
5 sensor
6 control unit
7 fresh cow dropping
8 cow dropping

The invention claimed is:

1. An animal husbandry system, wherein a group of animals can move about freely in a shed, comprising:
   a plurality of sensors suitable for monitoring respective different regions of the shed, wherein the sensors collectively are suitable for monitoring substantially the complete shed,
   an animal identification system suitable for identifying and locating individual animals in the shed,
   a processing means being provided, operatively connected to the sensors and to the animal identification system, said processing means being programmed for determining for each individual animal a urinating pattern and a defecating pattern and for generating a signal based on the urinating and/or defecating pattern.

2. The animal husbandry system according to claim 1, wherein said processing means are programmed for detecting animal excretion actions of a urine and/or a feces, and to link every detected animal excretion action to an individual animal in the shed.

3. The animal husbandry system according to claim 2, wherein the processing means are programmed for recognizing, with the aid of the sensors, if an animal lifts its tail.

4. The animal husbandry system according to claim 2, wherein the processing means are programmed to determine a spatial parameter and/or a temporal parameter related to the detected animal excretion actions.

5. The animal husbandry system according to claim 1, wherein said processing means are programmed for detecting animal excrement actions on a shed floor, and to link every detected animal excrement action to an individual animal in the shed.

6. The animal husbandry system according to claim 5, wherein the processing means are programmed to determine spatial and/or temporal parameters related to the detected animal excrement actions.

7. The animal husbandry system according to claim 2, wherein the processing means are programmed to distinguish between the urine and the feces.

8. The animal husbandry system according to claim 1, wherein the processing means are programmed to generate a health status signal based upon the determined animal urinating pattern and/or the determined animal defecating pattern.

9. The animal husbandry system according to claim 1, wherein the processing means are programmed to generate a calving status signal based upon the determined animal urinating pattern and/or the determined animal defecating.

10. The animal husbandry system according to claim 1, wherein the processing means are programmed to generate a stress status signal based upon the determined animal urinating pattern and/or the determined animal defecating pattern or the frequency.

11. The animal husbandry system according to claim 1, wherein the processing means are suitable for an artificial intelligence.

12. The animal husbandry system according to claim 1, wherein the processing means are programmed for determining that a certain area of the shed has to be cleaned and for generating a dedicated cleaning signal.

13. The animal husbandry system according to claim 1, further comprising an automatic cleaning means suitable for cleaning at least a part of the shed floor,
   wherein the processing means is programmed for establishing a degree of pollution of at least a part of the shed floor, and for activating the automatic cleaning means to clean said part of the shed floor as soon as a certain pollution threshold has been reached.

14. The animal husbandry system according to claim 13, wherein the automatic cleaning means comprise a cleaning robot suitable for picking up and removing feces, and the processing means being programmed for guiding the cleaning robot to a relevant part of the shed floor.

15. The animal husbandry system according to claim 12, wherein the processing means predict which area of the shed has to be cleaned, based on the determined animal urinating pattern and/or the determined animal defecating pattern.

16. The animal husbandry system according to claim 1, wherein said processing means are programmed for detecting urine and feces on the shed floor and to link every detected animal excrement action to an individual animal.

17. The animal husbandry system according to claim 1, wherein the animals are cows.

* * * * *